United States Patent [19]

Even, Jr. et al.

[11] Patent Number: 5,866,623

[45] Date of Patent: Feb. 2, 1999

[54] METHOD FOR IMMOBILIZING PARTICULATE MATERIALS IN A PACKED BED

[75] Inventors: William R. Even, Jr.; Stephen E. Guthrie; Thomas N. Raber, all of Livermore; Karl Wally, Lafayette; LeRoy L. Whinnery, Livermore; Thomas Zifer, Manteca, all of Calif.

[73] Assignee: Sandia Corporation, Livermore, Calif.

[21] Appl. No.: 34,536

[22] Filed: Mar. 3, 1998

[51] Int. Cl.$^6$ .................................. C08J 9/36; C08J 9/40; C08J 9/42
[52] U.S. Cl. .................................. 521/53; 521/65; 521/76
[58] Field of Search .................................. 521/53, 65, 76

[56] References Cited

U.S. PATENT DOCUMENTS

| | | | |
|---|---|---|---|
| 4,036,944 | 7/1977 | Blytas | 423/648 |
| 4,110,425 | 8/1978 | Buhl et al. | 423/658 |
| 4,385,019 | 5/1983 | Bernstein et al. | 264/49 |
| 4,923,535 | 5/1990 | Waters et al. | 149/19 |
| 5,360,461 | 11/1994 | Meinzer | 423/248 |
| 5,411,928 | 5/1995 | Heung et al. | 502/407 |

OTHER PUBLICATIONS

Emulsion–Derived Foams: Preparation, Properties & Applications, MRS Bulletin(1994) vol. XIX, No. 4, pp. 29–33, Even, et al.

Surface and Near Surface Structures in Carbon Microcellular Materials Produced from Organic Aerogels and Xerogels, Even, et al., (1995) Journal of Non–Crystalline Solids, vol. 186, pp. 191–199.

Porous Structures of Organic and Carbon Aerogels Synthesized by Sol Gel Polycondensation of Resorcinol with Formaldehyde, Tamon et al., Carbon (1997) vol. 35 No. 6, pp. 791–796.

*Primary Examiner*—Morton Foelak
*Attorney, Agent, or Firm*—Timothy Evans

[57] ABSTRACT

The present invention pertains generally to immobilizing particulate matter contained in a "packed" bed reactor so as to prevent powder migration, compaction, coalescence, or the like. More specifically, this invention relates to a technique for immobilizing particulate materials using a microporous foam-like polymer such that a) the particulate retains its essential chemical nature, b) the local movement of the particulate particles is not unduly restricted, c) bulk powder migration and is prevented, d) physical and chemical access to the particulate is unchanged over time, and e) very high particulate densities are achieved. The immobilized bed of the present invention comprises a vessel for holding particulate matter, inlet and an outlet ports or fittings, a loosely packed bed of particulate material contained within the vessel, and a three dimensional porous matrix for surrounding and confining the particles thereby fixing the movement of individual particle to a limited local position. The established matrix is composed of a series of cells or chambers comprising walls surrounding void space, each wall forming the wall of an adjacent cell; each wall containing many holes penetrating through the wall yielding an overall porous structure and allowing useful levels of gas transport.

10 Claims, 2 Drawing Sheets

METHOD FOR IMMOBILIZING PARTICULATE MATERIALS IN A PACKED BED

STATEMENT OF GOVERNMENT INTEREST

This invention was made with Government support under contract DE-AC04-94AL85000 awarded by the U.S. Department of Energy to Sandia Corporation.

The Government has certain rights in this invention.

BACKGROUND OF THE INVENTION

The present invention pertains generally to immobilizing particulate matter contained in a "packed" bed reactor so as to prevent powder migration, compaction, coalescence, or the like. More specifically, this invention relates to a technique for immobilizing particulate materials using a microporous foam-like polymer such that a) the particulate retains its essential chemical nature, h) the local movement of the particulate particles is not unduly restricted, c) bulk powder migration and is prevented, d) physical and chemical access to the particulate is unchanged over time, and e) very high particulate densities are achieved.

The utility of many materials used in industrial applications, particularly catalysts, is often limited by the surface area of the material available for reaction at any particular time. High surface forms of these materials, typically finely divided powders, are used extensively but efficiently using them in commercial processes remains of primary concern due to the need for bringing reactants together and constantly replenishing reagents as reactions proceed.

Increasing the reaction surface of a material is, therefore, only a first step. In order to use a material in reaction, it must be brought into contact, or at least very close proximity, with other active agents in order for a reaction to proceed. Unfortunately, finely divided powders are often difficult to handle in a manner which easily admits to intimate mixing. Various methods to address this problems have been implemented over the years. Some of the more familiar techniques include fluidized beds, and packed "fixed," beds wherein the reactive agent is supported by a secondary material or loosely contained in a closed retorts., and packed "moving" beds wherein reagents are mechanically passed through a reaction.

One very important class of materials used in packed beds are materials which form stable compounds with various gaseous species, i.e., getters, scrubbers, filters, converters (as in combustion exhaust converters), and the like. In particular, the class of materials known as hydrogen occulders, materials which form reversible "hydride" compounds when exposed to ambient hydrogen gas, are materials seen as the key to a hydrogen based economy. The ability to safely store very large quantities of this gas and quickly retrieve it for use would be a first step in replacing gasoline with hydrogen as the primary energy source for automobile transportation.

Such materials are known to include transition metal alloys having the formula $A_xB_yC_z$ where A is Fe, Mg, La, or Zr, where B is Co, Cr, Cu, Ni, or Ti and where C is Al. The parameter x in these alloys may vary from about 0.1 to about 2, y may vary between about 0.1 to about 5 and z may vary from about 0 to about 3. In particular, alloys such as those based on Fe—Ti and La—Ni—Al are often used in these systems. The lattice of these materials, however, are known to undergo significant volumetric deformation when the hydride reaction take place. The alloy lattice "swells," with the introduction of hydrogen, which fractures alloy particles breaking them up into still smaller particles. This size reduction promotes settling of the particles which eventually results in significant compaction and consolidation in the bed. As these particulate settle their local movement becomes increasingly restricted until the local swelling of many individual particles sums to create macroscopic swelling in the bed itself. In extreme, but not unusual, cases swelling of this sort will eventually split the containment vessel. Controlling the movement of the powder "fines" generated by these systems, therefore, is of primary concern.

Hybride reaction containers are often designed with elaborate internal baffling and channeling structures to prevent such powder migration. These techniques have worked well but they are expensive, costing not only money due to the complexity of the vessel fabrication, but decreased efficiency due to a lower packing density. A method for "fixing" hybride particles, immobilizing them in such a way as to prevent their compaction, would provide significant relief in reactor design.

While hydride materials have been emphasized for illustrative purposes similar problems occur in other types of packed beds whether or not particle comminution takes place during gas cycling: it is well known that the movement of pressure pulses or "waves" propagating through a bed can and does perturb the particulate contained therein sufficiently to tightly pack it the point where it blocks further gas transport. While this compaction may not lead to vessel failure (no swelling) it none-the less destroys integrity and effectiveness of the bed by restricting flow of a reacting fluid, be it a gas or a liquid.

Finally, catalytic reactors, such as petroleum "crackers", $NO_x$ converters, as well as hybride reactors, can be highly exothermic. Controlling the release of this waste heat in order to prevent it from damaging both the bed and surrounding equipment can be difficult. By selectively introducing an immobilizing medium whose thermal properties are complimentary with those of the bed, in use, the excess heat generated by the bed reaction can be exactly moderated by a phase transition heat of reaction, such as a glass transition, in the immobilizing media. As the bed reaction heats the media, the media passively uses that heat to initiate a reversible phase transition, and acts to "sink" the heat of reaction in the bed and thereby eliminating "hot spots."

DESCRIPTION OF THE PRIOR ART

It is well known in the art to mix a polymer binder with powders for the purpose forming a composite material having an open or "pore"-like internal structure. Several others teach providing a means for holding a hydriable powder in a porous structure. In particular, U.S. Pat. No. 5,411,928 teaches forming a sol composition which combines various transition metals and alloys with tetraethylorthosilicate and an acidic pore former miscible in the silicate to produce a composite glassy gel. U.S. Pat. No. 5,360,461 teaches making a hydrogen storage device which includes mechanically imbedding a hybride powder into a pre-formed polymer workpiece. U.S. Pat. No. 4,110,425 and 4,036,944 each teach a process for mixing a powder with a thermoplastic or a thermosetting polymer imbedding material to form a composite material composition.

It is instructive to note that in each case, the prior art teaches a method for mixing a powder with a polymerizable material in order to bind the powder into a pliable, plastic composite. In each case, except that of U.S. Pat. No.

5,360,461, the powder is introduced into the pre-polymerized polymer. This method, however, forms a suspension of the powder in the imbedding material. The ability to generate high powder densities before the powder begins to settle out of suspension is limited by the rheological behavior of the powder in the suspension media.

The instant invention teaches a method of immobilizing particulate materials in the reactor itself. None of the previous authors teach of forming a consolidated body within a gas reactor by reacting a polymer, emulsion, or the like, in the reactor itself in situ as it were.

It is advantageous not to have to resort to mixing the reactor bed powders into the encapsulating material when creating composite bodies. As noted above, mixing the powder with the pre-polymer places an upper limit on the quantity of material loaded into the encapsulation material before exceeding the suspension limit of the encapsulating medium. Furthermore, the average particle size which can be effectively suspended is on the order of several 10's of microns; considerably smaller then most starting materials. By way of contrast, in situ encapsulation avoids the disadvantage of low packing density and can be used with any size particle distribution.

SUMMARY OF THE INVENTION

The principle object of this invention is to provide a method for immobilizing particulate materials in a packed reaction bed after said reaction bed has been fabricated.

Another object of this invention is to provide a method for contain particulate materials which would facilitate design and use of lighter weight and less expensive composite vessels.

Another object of this invention is to provide a method for engineering the thermodynamic characteristics of the immobilizing media to utilize the heats of reaction in the reactor media such that they are counterbalanced by those of the powder.

A further object of this invention is to provide an apparatus for either reversibly or reversibly receiving and storing a gas species.

Yet another object of this invention is to provide a method for irreversibly scavenging a gas species.

Still another aspect of this invention is to provide a method for making a bio-chemical filter of reactors.

The immobilized bed of the present invention comprises a vessel for holding a powder which has an inlet and an outlet, a loosely packed bed of powder contained within the vessel, and a three dimensional porous matrix which penetrates and surrounds the particles of the powder thereby fixing the movement of individual particle to a limited local position. The established matrix is composed of a series of cells or chambers comprising walls surrounding void space, each wall forming the wall of an adjacent cell. Furthermore, each wall contains many holes penetrating through the wall yielding an overall porous structure which has a foam-like quality. In one embodiment this matrix is prepared as liquid emulsion or gel, introduced as a liquid into the bed reactor container, and a stabilization reaction initiated. The liquid emulsion or gel introduced into the bed is chosen to have a viscosity about that of water such that all or nearly all of the bed material is wetted resulting is an intimate co-mingling of the emulsion/gel with the powder. In a second embodiment, a thermally induced polymer phase separation causes the precipitation of an interstitial matrix.

Because off the highly porous nature of the incorporating foam, the immobilized bed reacts as if the foam were not present, that is, and the absorption-desorption characteristics of the powder are not changed and the pressure drop across the inlet and outlet of the reactor remains acceptable engineering bounds.

DETAILED DESCRIPTION OF THE PREFERRED EMBODIMENT

In its broadest embodiment, the present invention relates to a method for providing an immobilized packed bed reactor. More specifically, the instant invention relates to a method for preventing migration of loose powders in a packed bed reactor and thereby potentially destroying the effectiveness of the reactor. More specifically, this invention relates to providing an apparatus for reversible irreversible absorption or adsorption ("sorption") of a gas specie, such as hydrogen, oxygen, nitrogen, $CO_2$, HCl, $SO_2$, $NO_x$, or water, or any of a number of biochemically active agent such as enzymes, bacteria, and bioactive catalysts.

Figure 1:
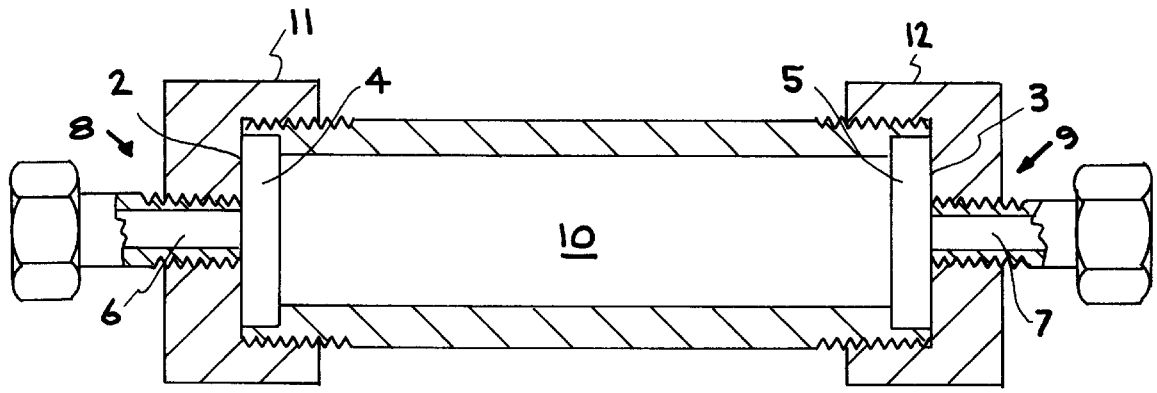
FIG. 1 provides a cross-sectional view of a simplified reactor comprising a reaction vessel, frits, end caps, gas fittings, particulate matter and foam.

In its simplest form the instant invention, shown in FIG. 1, comprises a hollow tube or vessel 1 having recessed openings 2 and 3 for "frit"-type plugs 4 and 5 for creating a barrier separating the vessel interior from the environment at vessel openings 6 and 7, and fluid tight fittings and related plumbing 8 and 9 for fluid transport. The interior of the vessel is loosely packed with powder 10 having a substantial selective affinity for a chemical or biochemical specie. Those skilled in the art will recognize that the container could consist of any appropriately chosen vessel, whether simple or elaborate, and could be fabricated from any material compatible with powder 10 to be immobilized and the service conditions and environment expected to be encountered.

Powder 10 is loaded into vessel 1 forming a "bed" and an immobilizing media comprising any of a polymerizable fluid emulsion, a gel, is prepared and introduced into the contained bed as a liquid. The reactor is then tightly closed by means of end caps 11 and 12 over the recessed openings 2 and 3, and the phase separation reaction initiated.

EXAMPLE 1

An emulsion is formed by first preparing a mixture comprising equal amounts of the polymerizable oil species such as methacrylonitrile and divinylbenzene and a small amount of a surfactant, such as sorbitan monooleate. This mixture is degassed by pulling a rough vacuum on it. A second solution is then prepared comprising distilled water containing a cross-linking initiator catalyst such as sodium persulfate. A solution concentration of about 0.04M is used. Also included in the water mixture is a processing salt to stabilize the emulsion. A salt concentration of about 0.25M ammonium chloride is suitable. This water solution (the extractable phase) is slowing added to the methacrylonitrile/divinylbenzene oil solution (oil phase) while constantly agitating the mixture until a 10:1 water to oil emulsion mixture is achieved. The liquid emulsion is introduced into the packed bed, here by pressurized injection, in sufficient quantity and under sufficient pressure to migrate completely through the bed and out the opposite end plug. The ends of the vessel are then sealed. By moderately heating the emulsion fluid within the vessel to about 60° C. for 8 to 12 hours the polymerization reaction is caused to proceed to completion. The process is completed by removing the pore-forming phase by simple extraction techniques such as drying, by sublimation, or by washing with an appropriate solvent. What remains is a porous foam condensant of polymerized material comprising an open network surrounding each particle in a rigid structure of hollow cells or chambers.

Figure 4:
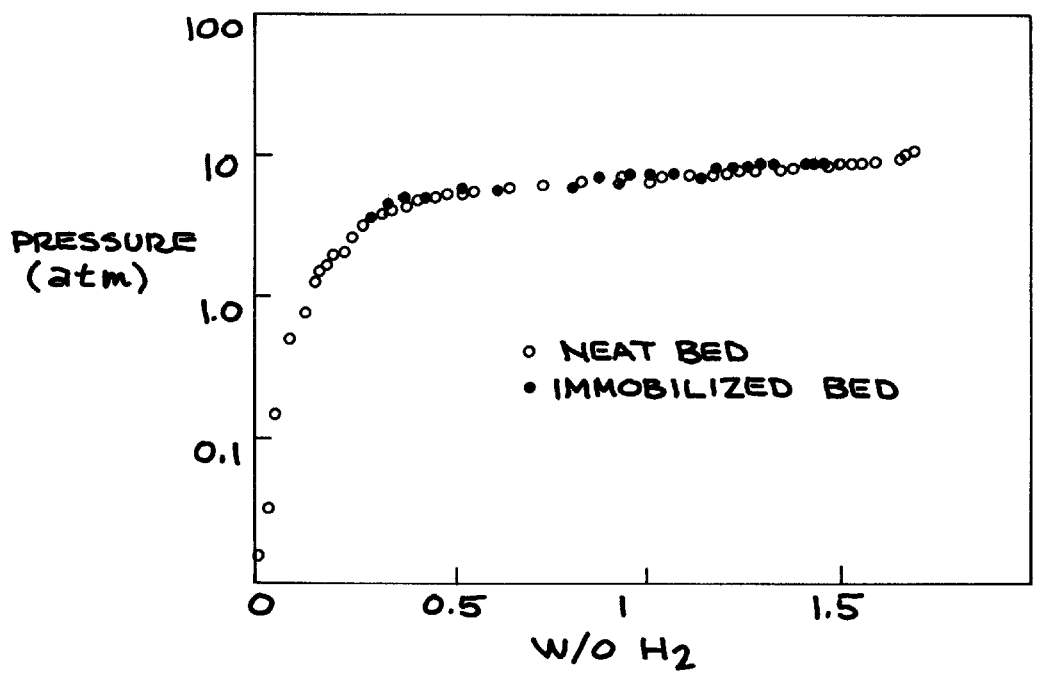
FIG. 4 illustrates the performance characteristics of a hydride bed reactor.
Figure 2:
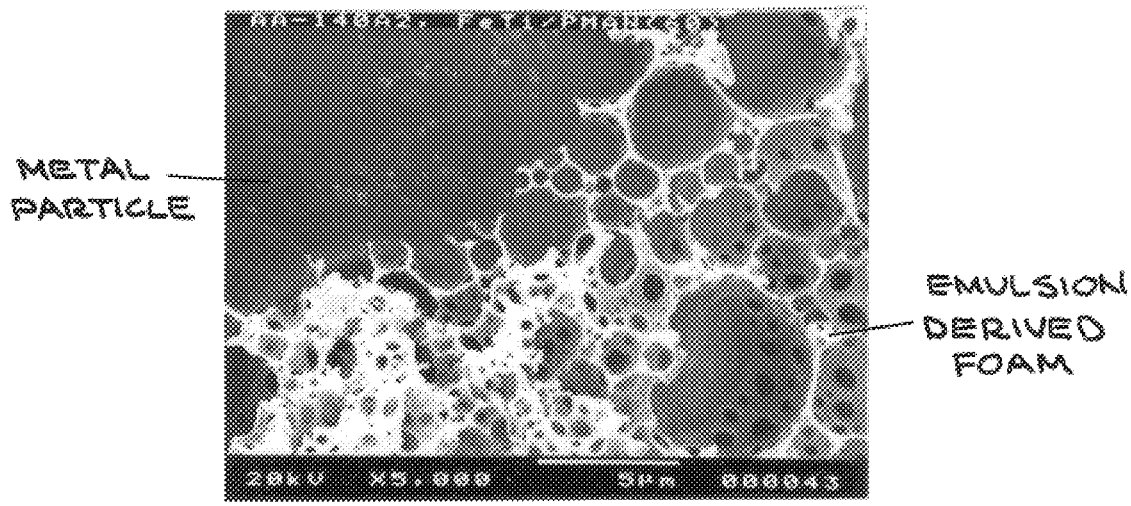
FIG. 2 shows a magnified view of the polymerized foam surrounding reactor bed particles.
Figure 3:
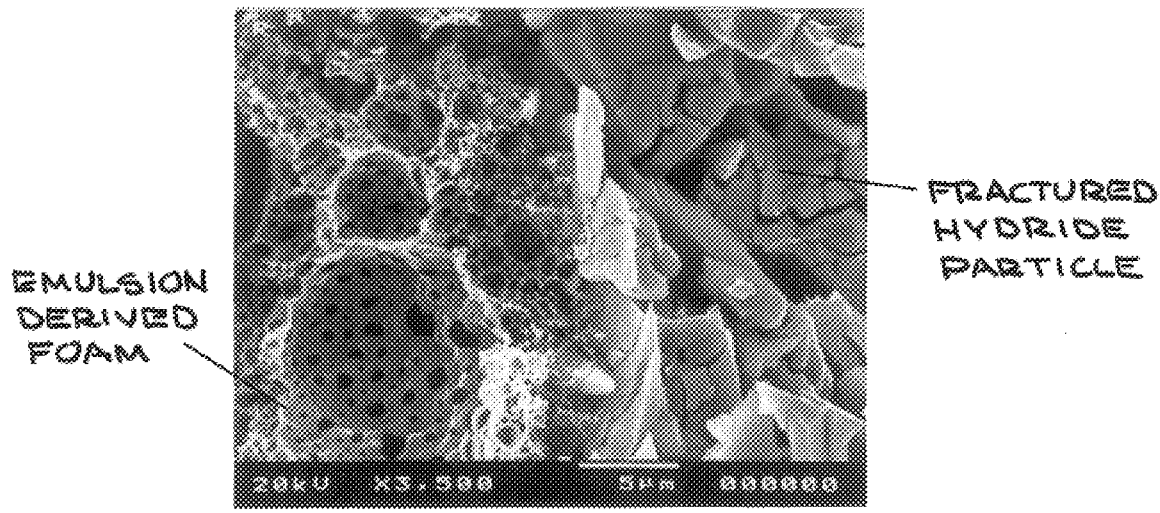
FIG. 3 shows the entrapment and immobilization of comminuted particles by the foam lattice surrounding the particles.

FIGS. 2 and 3 illustrate an example of such an immobilized bed. FIG. 2 shows a single Fe—Ti particle surrounded by an emulsion derived foam; FIG. 3 shows a fragmented Fe—Ti particle after hydride cycling. FIG. 4 illustrates the apparent lack of deleterious effect of the immobilizing media on the ability of the particle bed to combine with hydrogen during the hydriding cycle.

EXAMPLE 2

In a variation of the foregoing Example, the methacrylonitrile divinylbenzene-water PMAN system is modified by formed an emulsion by incorporating a third monomer, in this case 2-ethylhexyl acrylate, as a flexiblizer. The 2-ethylhexyl acrylate is added at between about 15% to 30% of the total monomer load. Subsequent processing is as has been described in Example 1. The porous foam condensant which remains after extracting the pore-former is tougher and more resilient then unmodified systems.

EXAMPLE 3

Assemblies are also prepared with microporous homopolymers using the process known as thermally induced phase separation or "TIPS". Samples were made with polystyrene homoplymer at densities off about between 30 mg/cc to 80 mg/cc. Other were made with poly(4-methyl-1-pentene homoploymer (TPX) at densities about between 50 mg/cc to about 120 mg/cc. The practical working temperature range of the polymers is up to 100° C. for polystyrene to about 235° C. for TPX. The solvent used for polystyrene was 2,2-difluorotetrachlorethane; for TPX the solvent was cyclohexane.

The procedure used to produce the packed bed immobilized by the foam emulsion was as follows:
 i) the polymer is dissolved in the appropriate solvent (concentration of the polymer determining the resulting foam density);
 ii) the subsequent solution is infused into a bed which is heated to match the solution temperature;
 iii) the infused assembly is then cooled to induce the solution phase separation; and
 iv) the solution solvent is removed by either an exchange process or by heat assisted or unassisted evaporation.

Those skilled in the art will recognize that this technique is not limited to organic emulsions but is equally operative when using an inorganic gel such as sol-gels to immobilize the reactor bed. Gels based on silicon are particularly useful due to their ability to withstand exposure to elevated temperatures. A typical silica-based gel is the so-called xerogel and would he particularly useful when used to immobilize hydride powders since the silicate matrix would he able to withstand the temperature excursions necessary to load and release hydrogen stored in situ.

EXAMPLE 4

Assemblies utilizing a xerogel to immobilize a packed bed may be prepared as follows:
 i.) An a sodium and/or potassium waterglass solution is prepared by dissolving the silicate into an amount of heated water and then adjusting the solution pH too preferably <2.2 by using an acid ion exchange resin, such those containing sulfonic acid groups, or by adding a mineral acid such as HCl or $H_2SO_4$.
 ii.) The silicic acid solution produced in i.) is treated with a base, such as $NH_4OH$, NaOH, KOH, Al(OH) and/or colloidal silicic acid to polycondense the solution to form an $SiO_2$ gel. If a mineral acid is used in step i.), washing the gel with water to remove the residual acid. A final pH of between 4 and 9 is desired.
 iii.) The treated solution is then infused into the packed bed and the solution/gel/particulate mix is allowed to age at a temperature of between 80° C. to 30° C. for between several seconds to several hours, depending upon the temperature of the solution.
 iv.) Water is removed from the gel by extractive distillation with an organic solvent which forms an azeotrope with water and which separates into two phases upon cooling until the water content of the gel is <2% ; by weight. Suitable solvents are toluene, di-n-butyl ether, or methyl isobutyl ketone;
 v.) After removing the preponderance of the water the solvent containing gel reacting the gel with a silylating agent such as mono, di, or trimethylchlorosilane, trimethylmethoxysilane or hexamethyl-disilazane. The reaction is carried out at temperatures between 30° C. and 70° C.
 vi.) The process is completed by drying the silylated gel below the critical temperature and pressure of the solvent used in step iv.) above.

Lastly, another embodiment would include bed materials specific to acid gases including, but not limited to activated carbons and the like.

EXAMPLE 5

Assemblies utilizing a open cell urethane foam to immobilize a packed bed are prepared as follows:

An alcohol mixture comprising a quantity of a polyalcohol such as VORANOL 490® (Dow Chemical Company) CAS Nos. 025791-96-2 and 009049-71-2, a primary alcohol such as glycerol, a polyalkyleneoxidimethylysiloxane copolymer surfactant such as Niax Silicone Y-10762 (Osi Specialties Inc.), and a small amount of dionized water to an isocyanate such as ISONATE 2181® (Dow Chemical Company) CAS Nos. 026447-40-5 and 068092-58-0. This solution is mixed using a Conn mixing blade and then infused in a particulate bed containing ASZM-TEDA® metal-impregnated active carbon granules (Calgon Carbon Corporation). The bed is cured in air at about 70° C. for about 16 hours. The resultant bed comprises a rigid foam body having high compressive strength and as much as 80 w/o carbon.

A number of embodiments of this invention have been set forth. Still others are possible and various modifications will be apparent to those skilled in the art in view of the foregoing disclosure. It is to be understood that these modifications and variations may be resorted to without departing from the spirit and scope of the invention. Such modifications and variations are considered to be within the purview and scope of this disclosure and its appended claims.

What is claimed is:

1. A method for immobilizing a particulate material comprising the steps of:
   a.) placing a predetermined quantity of a particulate into a containing vessel, said powder comprising particles and interstices between said particles;
   b.) preparing an emulsion comprising a polymerizable material, said emulsion having a continuous phase and a pore forming extractable phase;
   c.) dispersing said emulsion into said container throughout said powder;
   d.) sealing said vessel;
   e.) initiating a polymerizing reaction in said emulsion to form a three dimensional porous foam condensant; and
   f.) removing said extractable phase.

2. The method of claim 1 wherein said step of removing further comprises assisted or unassisted evaporation.

3. The method of claim 1 wherein said step of removing further comprises sublimation.

4. The method of claim 1 wherein said step of removing further comprises displacing said extractable phase with a solvent miscible in said extractable phase followed by the step of extracting said solvent with super-critical carbon dioxide.

5. The method of claim 1 wherein said particulate is a mole sieve.

6. The method of claim 1 wherein said particulate is a catalyst.

7. The method of claim 1 wherein said particulate is a granular carbon, said carbon granules containing one or more transition metals on an exterior surface.

8. The method of claim 1 wherein said powder is bioactive agent.

9. The method of claim 1 wherein said porous foam condensant has a density of about between 30 mg/cm$^3$ to 200 mg/cm$^3$ and preferably about between 30 mg/cm$^3$ to 60 mg/cm$^3$.

10. A method for immobilizing a particulate material comprising the steps of:
    a.) placing a predetermined quantity of a particulate into a containing vessel, said powder comprising particles and interstices between said particles;
    b.) preparing a resin comprising a polymerizable material and a gas generator;
    c.) dispersing said resin into said container througout said powder;
    d.) sealing said vessel; and
    e.) initiating a polymerizing reaction in said resin to form a three dimensional polymerized foam condensant.

* * * * *